United States Patent
Liu et al.

(10) Patent No.: US 12,252,426 B2
(45) Date of Patent: Mar. 18, 2025

(54) WETLAND SYSTEM FOR TREATING DOMESTIC WASTEWATER AND RAINWATER AND APPLICATION THEREOF

(71) Applicant: CHINA MCC5 GROUP CORP.LTD, Sichuan (CN)

(72) Inventors: Jianhui Liu, Sichuan (CN); Li Luo, Sichuan (CN)

(73) Assignee: CHINA MCC5 GROUP CORP. LTD, Sichuan (CN)

( * ) Notice: Subject to any disclaimer, the term of this patent is extended or adjusted under 35 U.S.C. 154(b) by 163 days.

(21) Appl. No.: 17/730,078

(22) Filed: Apr. 26, 2022

(65) Prior Publication Data

US 2022/0411303 A1    Dec. 29, 2022

(30) Foreign Application Priority Data

Jun. 25, 2021  (CN) .......................... 202110712871.6

(51) Int. Cl.
*C02F 9/00* (2023.01)
*B01D 29/44* (2006.01)
(Continued)

(52) U.S. Cl.
CPC .............. *C02F 9/00* (2013.01); *B01D 29/445* (2013.01); *C02F 1/001* (2013.01); *C02F 1/32* (2013.01);
(Continued)

(58) Field of Classification Search
CPC .... C02F 9/00; C02F 1/001; C02F 1/32; C02F 1/74; C02F 3/1268; C02F 3/28;
(Continued)

(56) References Cited

U.S. PATENT DOCUMENTS

2014/0138307 A1* 5/2014 Coffman ................. C02F 3/327
                                                        210/170.03
2019/0352859 A1* 11/2019 Hartman ................ E01C 9/086

FOREIGN PATENT DOCUMENTS

CN        101113050 A  *  1/2008
CN        101948214 A  *  1/2011
(Continued)

OTHER PUBLICATIONS

Machine-generated English translation of KR 102108870, generated on Jun. 24, 2024.*

(Continued)

*Primary Examiner* — Fred Prince
(74) *Attorney, Agent, or Firm* — NKL Law; Allen Xue

(57) ABSTRACT

A wetland system has a wetland structure and a wastewater treatment device. The wetland structure has several planting areas surrounded by hoardings, several planting frames arranged in the hoardings, growing substrates provided in the planting frames, and wetland plants growing on the growing substrates. The wastewater treatment device has a bar screen, a regulating tank, a hydrolysis acidification tank, a contact oxidation tank, an MBR membrane tank, and a clean water tank that are in communication with each other in sequence of waterflow and arranged underground. The bar screen is provided with several bars therein, a lift pump is connected between the regulating tank and the hydrolysis acidification tank, a drainage pump is provided between the MBR membrane tank and the clean water tan. The planting area is connected to the bar screen via pipelines, and the clean water tank is connected to the planting area via pipelines.

8 Claims, 4 Drawing Sheets

(51) Int. Cl.
*C02F 1/00* (2023.01)
*C02F 1/32* (2023.01)
*C02F 1/74* (2023.01)
*C02F 3/06* (2023.01)
*C02F 3/10* (2023.01)
*C02F 3/12* (2023.01)
*C02F 3/28* (2023.01)
*C02F 3/32* (2023.01)
*C02F 11/12* (2019.01)
*C02F 3/02* (2023.01)
*C02F 101/30* (2006.01)
*C02F 103/00* (2006.01)

(52) U.S. Cl.
CPC .............. *C02F 1/74* (2013.01); *C02F 3/02* (2013.01); *C02F 3/06* (2013.01); *C02F 3/101* (2013.01); *C02F 3/1268* (2013.01); *C02F 3/28* (2013.01); *C02F 3/32* (2013.01); *C02F 3/327* (2013.01); *C02F 11/12* (2013.01); *C02F 2101/30* (2013.01); *C02F 2103/001* (2013.01); *C02F 2303/04* (2013.01); *C02F 2303/16* (2013.01); *Y02W 10/10* (2015.05)

(58) Field of Classification Search
CPC .............. C02F 11/12; C02F 2101/30; C02F 2103/001; C02F 2303/04; C02F 2303/16; C02F 3/06; C02F 3/101; C02F 3/02; C02F 3/32; C02F 3/327; B01D 29/445; Y02W 10/10
See application file for complete search history.

(56) References Cited

FOREIGN PATENT DOCUMENTS

| | | | | |
|---|---|---|---|---|
| CN | 106277572 | A | * 1/2017 | .............. C02F 9/00 |
| CN | 211226837 | U | * 8/2020 | |
| KR | 102108870 | B1 | * 5/2020 | |

OTHER PUBLICATIONS

Machine-generated English translation of CN 106277572, generated on Nov. 1, 2024.*

* cited by examiner

100

WETLAND SYSTEM FOR TREATING DOMESTIC WASTEWATER AND RAINWATER AND APPLICATION THEREOF

TECHNICAL FIELD

The invention relates to the technical field of construction, more specifically, a wetland system for treating domestic wastewater and rainwater and application thereof.

BACKGROUND

Rainwater wetland, which purifies rainwater through physical processes, aquatic plants and microorganisms, serves as a highly efficient facility for controlling runoff pollution at a much lower labor and time costs. That said, rainwater wetlands with prior art are struggling with high construction & maintenance costs, spatial and regional limitations in construction, and difficulty in recycling. As wastewater treatment is a critical process in water purification, reducing manpower thereof can save both labor and material costs. Currently, traditional wastewater treatment equipment is disadvantaged by:
1. poor solid-liquid separation efficiency;
2. troublesome cleaning of solid wastes in the equipment after solid separation;
3. poor impact resistance in case of sharp changes in the amount of incoming water.

SUMMARY OF THE INVENTION

To overcome the disadvantages of the prior art, the invention provides a wetland system for treating domestic wastewater and rainwater and application thereof, which integrates wastewater treatment and rainwater wetland by supplying rainwater wetlands with moisture from treated wastewater, with a view to improving water resource utilization, further purifying water with rainwater wetlands and thus realizing a higher purification efficiency.

The invention is realized by the following technical solution: a wetland system for treating domestic wastewater and rainwater, comprising a wetland structure and a wastewater treatment device, wherein the wetland structure comprises several planting areas surrounded by hoardings, several planting frames arranged in the hoardings, growing substrates provided in the planting frames, and wetland plants growing on the growing substrates, the wastewater treatment device comprises a bar screen, a regulating tank, a hydrolysis acidification tank, a contact oxidation tank, a MBR membrane tank, and a clean water tank that are in communication with each other in sequence of waterflow and arranged underground, the bar screen is provided with several bars therein, a lift pump is connected between the regulating tank and the hydrolysis acidification tank, a drainage pump is provided between the MBR membrane tank and the clean water tan, the planting area is connected to the bar screen via pipelines, and the clean water tank is connected to the planting area via pipelines.

Furthermore, to better realize the invention, the planting area is polygonal with a 90° corner thereof, and the planting frame is cuboid.

Furthermore, to better realize the invention, two opposite sides of the planting frame are provided with protrusions perpendicular to the length direction, the other two opposite sides of the planting frame are provided with grooves perpendicular to the length direction, adjacent planting frames are integrated with each other through matching of the protrusions and grooves, and the hoardings are provided with grooves that can be fitted with the protrusions.

Furthermore, to better realize the invention, the planting frame is made of permeable materials.

Furthermore, to better realize the invention, the two adjacent planting areas are in communication with each other via pipelines, and the hoardings are made of impermeable materials.

Furthermore, to better realize the invention, a reflux pipeline is connected between the MBR membrane tank and the hydrolysis acidification tank.

Furthermore, to better realize the invention, the MBR membrane tank is connected to a sludge thickener, and a sludge pump is connected between the MBR membrane tank and the sludge thickener.

Furthermore, to better realize the invention, the contact oxidation tank is provided with bio-packings therein, and the MBR membrane tank is connected to a dosing device.

Furthermore, to better realize the invention, a UV disinfector is arranged at the outlet of the disinfection tank, a fan is connected to the contact oxidation tank, and a backwash pipeline is connected to the drainage pump.

The beneficial effects of the invention are as follows: The invention uses the planting frames as basic units, making transportation, installation and construction easier, wherein the construction is free of geographical limitations, and structures of different shapes can be easily combined as required or based on terrain. The bar screens can improve the efficiency of solid-liquid separation, avoiding blockage or equipment damage caused by large particles of fixed substances entering the downstream processing equipment. The regulating tank can buffer and reduce the water inlet pressure of the downstream equipment, adjust the water quality, and reduce the impurity concentration. In addition, the inlet water pressure of the downstream equipment can be controlled by the lift pump.

Among them, 1—hoarding, 2—planting frame, 3—protrusion, 4—groove, 5—pipeline, 6—locking sleeve, 7—lifting ring, 8—bar screen, 9—regulating tank, 10—lift pump, 11—hydrolysis acidification tank, 12—contact oxidation tank, 13—MBR membrane tank, 14—flowmeter, 15—drainage pump, 16—backwash pipeline, 17—clean water tank, 18—sludge thickener, 19—UV disinfector, 20—dosing device, 21—fan, 22—reflux pipeline, 23—sludge pump.

DETAILED DESCRIPTION OF THE PREFERRED EMBODIMENTS

The present invention will be further described in detail in combination with examples, but it is not limited to the following embodiments.

Embodiment 1

Figure 1:
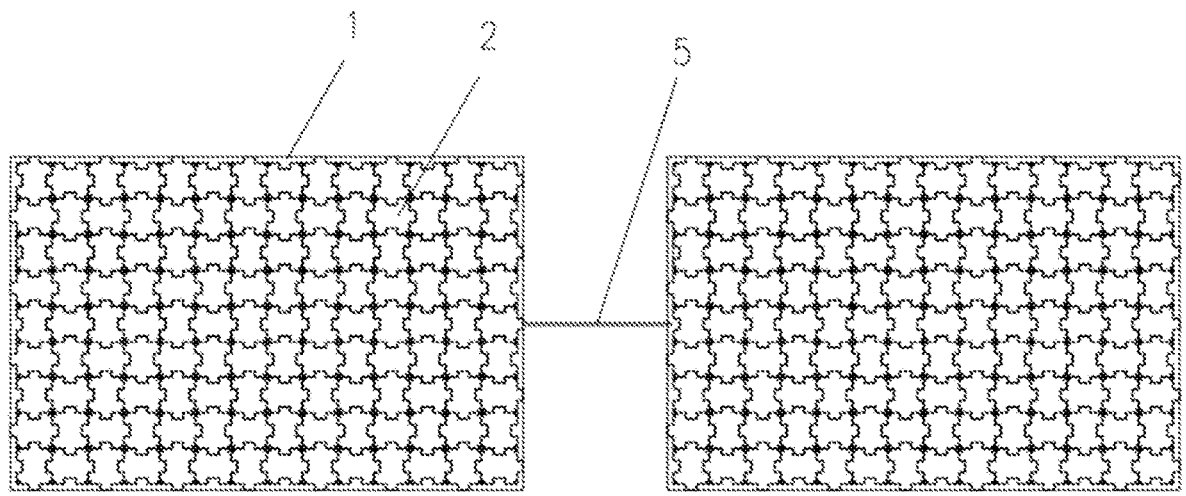
FIG. 1 is the structural schematic diagram of the wetland structure.
Figure 2:
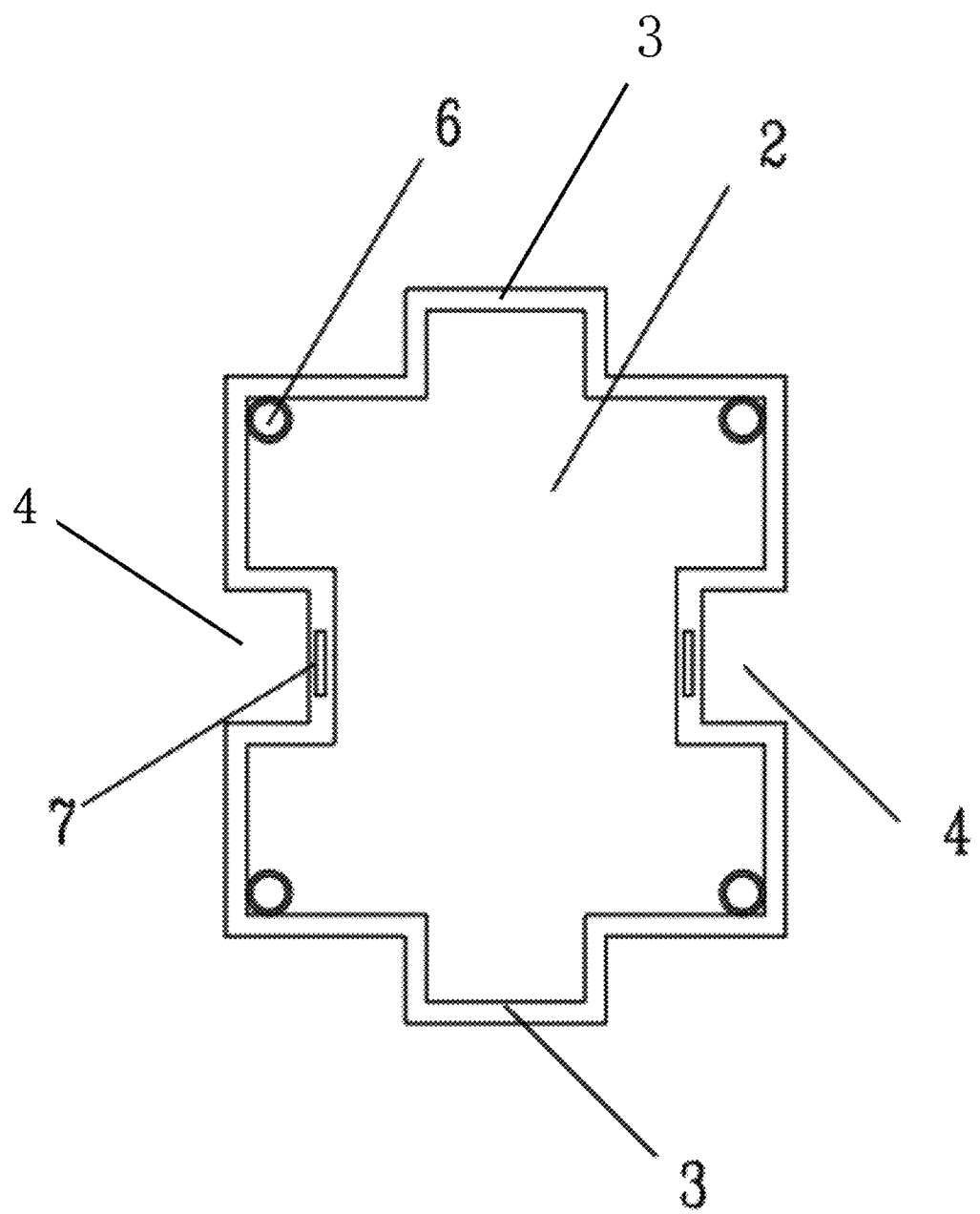
FIG. 2 is the structural schematic diagram of the planting frame.
Figure 3:
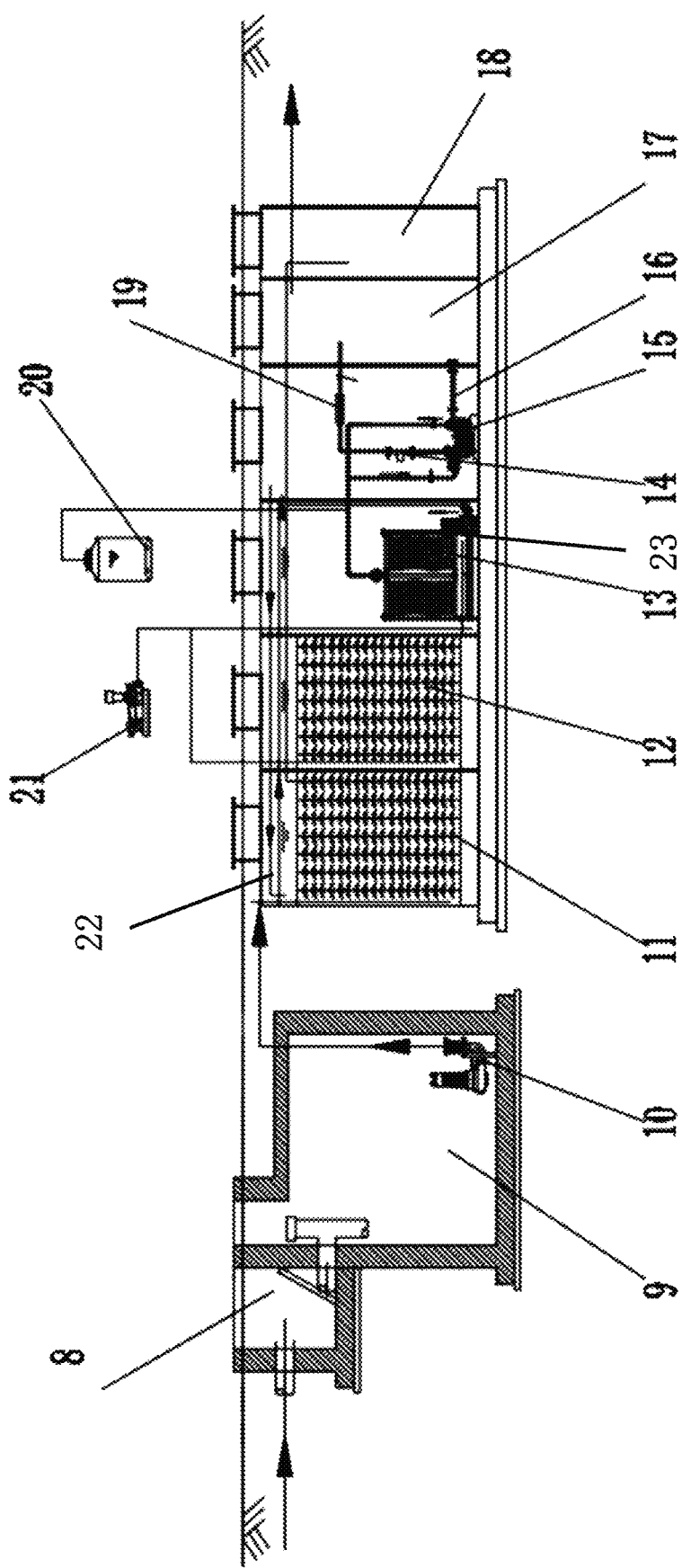
FIG. 3 is the structural schematic diagram of the wastewater treatment device.
Figure 4:
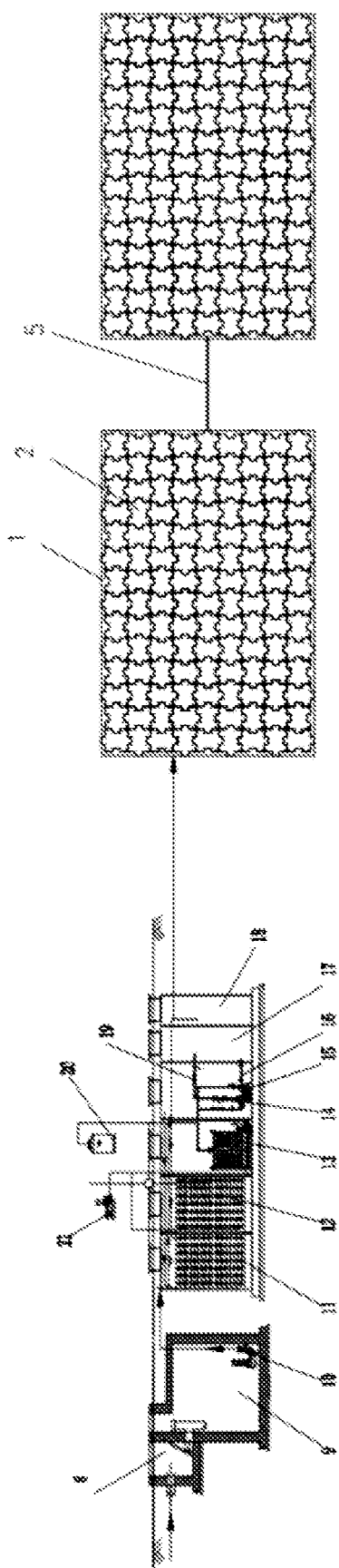
FIG. 4 is the schematic diagram of the connection between the wetland structure and the wastewater treatment device.

As shown in FIGS. 1, 2, 3 and 4, in the embodiment, a wetland system for treating domestic wastewater and rainwater, comprising a wetland structure and a wastewater treatment device, wherein the wetland structure comprises several planting areas surrounded by hoardings, several planting frames arranged in the hoardings, growing substrates provided in the planting frames, and wetland plants growing on the growing substrates, the wastewater treatment device comprises a bar screen, a regulating tank, a hydrolysis acidification tank, a contact oxidation tank, an MBR membrane tank, and a clean water tank that are in communication with each other in sequence of waterflow and arranged underground, the bar screen is provided with several bars therein, a lift pump is connected between the regulating tank and the hydrolysis acidification tank, a drainage pump is provided between the MBR membrane tank and the clean water tan, the planting area is connected to the bar screen via pipelines, and the clean water tank is connected to the planting area via pipelines.

The wastewater to be treated enters the bar screen 8, and then is subject to pre-filtering by bars in the bar screen 8 to separate large solid particles. This can relieve the downstream equipment of operating pressures and prevent large particles of impurities from blocking or damaging the equipment. The regulating tank 9 serves as a reservoir for storing water shortly, thereby regulating the water inlet pressure of the downstream equipment. Besides, the regulating tank 9 can be added with clean water as required to lower the impurity concentration. Macromolecules and most of organic matters in river water in the hydrolysis acidification tank 11 are decomposed to reduce COD partially. Preliminary biochemical treatment is carried out in the contact oxidation tank 12, with the effluent therefrom entering the MBR membrane tank 13 for advanced biochemical treatment. In this embodiment, the MBR membrane tank 13 is provided with bio-packings, on which a layer of biological film is attached. The biological film adsorbs and degrades the organic matter in the water, so that organic matters in the wastewater can be fully purified. Water filtered by the MBR membrane tank 13 is pumped by the drainage pump 15 into the clean water tank 17. Water in the clean water tank 17 can be supplied to the wetland structure.

During the construction of the wetland structure, the planting frames are installed in the planting area surrounded with several hoardings. Based on appearance requirements or terrain restrictions, the planting area surrounded by hoardings can be of different regular or irregular shapes, in which the planting frames are placed as basic units and can also form different shapes. The planting frame and the growing substrates therein can be prefabricated, so that they don't need to be fabricated on site. After being transported to the site, they can be put into use quickly and conveniently, thus ensuring a high construction efficiency.

The hoardings can be constructed above-ground or underground, to make the top surface of the hoardings higher, flush with, or lower than the ground level as required by design.

Water supplied by the clean water tank 17 can be accumulated in the planting area to simulate the ecological environment of the wetland, thus facilitating the normal growth of wetland plants. Alongside that, wetland plants can help purify rainwater and water supplied by the clean water tank 17, absorbing nitrogen, phosphorus and sulfur thereof. The planting area can be connected to a water storage pool/tank to store the purified water, which can better save the water.

In the embodiment, the bar screen 8, the regulating tank 9, the hydrolysis acidification tank 11, the contact oxidation tank 12, the MBR membrane tank 13 and the clean water tank 17 are arranged underground. In this way, the system avoids occupying too much above-ground space and leaves the space for other structures and buildings, which is suitable for scenarios including gardens, green belts, zoos, botanical garden, communities, and commercial streets. The drainage pump 15 and the lift pump 10 can be connected to a controller for remote control.

Embodiment 2

On the basis of the above embodiment, in this embodiment, the planting area is polygonal with a 90° corner thereof, and the planting frame is cuboid. This is to facilitate the bonding between the outer planting frames and the hoardings, so that the planting frames can be stably, neatly installed in the planting area, to achieve a higher space utilization therein. The planting frames also facilitate production in a unified way.

Embodiment 3

On the basis of the above embodiment, the planting frames in this embodiment comprise a hollow frame body and growing substrates arranged therein, wherein the frame body is a cuboid.

During construction, the growing substrates are put into the planting frame, the plants are implanted in the growing substrates, and a plurality of the planting frames are arranged in an array as required by design. As the planting frames are cuboid, the adjacent planting frames can be fitted together in case they need to be arranged densely, reducing or avoiding gaps therebetween, thereby improving the space utilization and the density of plants. Aside from that, the planting frames can be fitted tightly during transportation, to avoid collision between two adjacent planting frames, achieving a higher space utilization during transportation. This can improve the transportation efficiency of the planting frames.

In this embodiment, two opposite sides of the frame body are respectively provided with a vertically arranged protrusion 3, and the other two sides of the frame body are provided with grooves 4 that can be fitted with the protrusions 3. Adjacent planting frames can be integrated by matching of the protrusions 3 and grooves 4. This can improve the overall stability of the planting frames, so that the installed planting frames are not easily deformed by external force and the plants can be arranged neatly. In addition, the planting frames that are already installed can provide positioning reference for the adjacent planting frames, so that there is no need to draw lines repeatedly at the construction site, thus making construction easier and ensuring a higher construction efficiency.

In this embodiment, the protrusions and the corresponding grooves can be designed as T-shaped. In this way, after the adjacent planting frames are integrated by matching the protrusions and the grooves, the T-shaped structure can prevent the protrusions and the grooves from separating, thereby improving the connection strength of the adjacent planting frames.

The frame body is provided with a plurality of positioning protrusions at its top surface, and a plurality of positioning grooves that can be fitted with the positioning protrusions at its bottom surface. To provide more growth space for plant roots, the planting frames can enlarge the volume by multi-layer superposition. The bottom of the bottom layer can be sealed or not, and that of the middle and top layers are not sealed, to ensure the communication with the bottom layer.

Through the match between the positioning protrusions and the positioning grooves, the multi-layer planting frames can be located and installed more quickly, and the relative movement of the upper and lower planting frames along the horizontal direction can be limited. In this way, the overall stability of the planting frame is improved.

In this embodiment, a plurality of vertically arranged locking sleeves are arranged on the inner surface of the frame body. When the upper and lower planting frames are positioned and installed, the locking sleeves thereon are exactly aligned. By inserting locking pins, locking nails and other structures, the upper and lower planting frames can be locked tightly, thereby preventing the upper and lower planting frames from moving relative to each other and staggering amidst the action of external force. This can improve the overall stability of the planting frame and ensure the normal growth of plants.

In this embodiment, the locking sleeve is arranged at the inner corner of the planting frame, and the adjacent inner surfaces of the planting frame are connected to each other. The connection between the locking sleeve and the inner surface of the planting frame enables the locking sleeve to support the inner surface of the planting frame, thus improving the strength of the planting frame itself, and preventing the planting frame from being squeezed and deformed.

A lifting ring is provided at the top surface of the frame body. With the lifting ring as a force-bearing point, it is convenient to lift up the planting frame, so that a single planting frame can be taken out during replacement or maintenance. Besides, the lifting ring can be attached to ropes, hooks and the like for remote operation.

In this embodiment, the lifting ring is connected to a threaded rod, and the threaded rod is connected to the frame body via threaded connection. When setting up multi-layer planting frames, the lifting ring shall be attached on the top planting frame. Lifting ring arranged between two layers of planting frames may result in unnecessary gaps therebetween.

Embodiment 4

On the basis of the above embodiment, the planting frame in the present embodiment is made of permeable materials. In this way, water can circulate among the planting frames, avoiding resulting in stagnant water and affecting the growth of plants. In the rainy season, this also facilitates the rapid circulation of excess water and avoids siltation in the planting area.

In this embodiment, a lifting ring is provided on the top surface of the planting frame, so that the planting frame can be easily lifted up and taken out by attaching hooks, ropes and the like to the lifting ring.

Embodiment 5

On the basis of the above embodiment, the growing substrates in this embodiment comprise plant growth substrates and microbial substrates. Microorganisms for purifying nitrogen, phosphorus and/or sulfur are arranged in the microbial substrates. The plant growth substrate provides plants with planting base, and the microorganisms cultivated by the microbial substrate help absorb nitrogen, phosphorus and sulfur, thus improving the processing efficiency of nitrogen, phosphorus and sulfur in the entire system, while providing some nutrients for plant growth.

Embodiment 6

On the basis of the above embodiment, the adjacent two planting areas in this embodiment are in communication with each other via pipelines. In this way, excess water can circulate between different planting areas, helping gather and store the rainwater collected in the planting areas. With different planting areas located at different altitudes, it is convenient to quickly drain the water in the higher planting areas to lower ones. A switch can be arranged on the pipelines to control the on-off thereof.

The hoardings are made of impermeable materials, thus enabling the planting area to store water and maintain wetland environment.

Embodiment 7

On the basis of the above embodiment, a reflux pipeline 22 is connected between the MBR membrane tank 13 and the hydrolysis acidification tank 11. The reflux pipeline 22 can re-deliver the water filtered by the MBR membrane tank 13 to the hydrolysis acidification tank 11 for multiple cycles of filtration. This helps fully filter impurities or pollutants in the water and ensures a higher quality of filtered water. A reflux pump can be arranged on the reflux pipeline 22 to control the water flow. The reflux pump can be connected to a controller for remote control.

Embodiment 8

On the basis of the above embodiment, in this embodiment, the MBR membrane tank 13 is connected to a sludge thickener 18, and a sludge pump 23 is connected between the MBR membrane tank 13 and the sludge thickener 18. The sludge pump 23 pumps the sludge from the MBR membrane tank 13 to the sludge thickener 18, to prevent the sludge from blocking the MBR membrane tank 13 and thus reducing its efficiency.

Embodiment 9

On the basis of the above embodiment, the MBR membrane tank 13 in this embodiment is connected to a dosing device 20. In this way, it is convenient to add the required agents to the MBR membrane tank 13 via the dosing device 20, thus ensuring the vitality of microorganisms in the MBR membrane tank 13 and the filtration efficiency thereof. In this embodiment, a dosing pump can be provided on the pipeline between the dosing device 20 and the MBR membrane tank 13 to control the efficiency of dosing. The dosing pump can be connected to a controller for remote control.

Embodiment 10

On the basis of the above embodiment, the drainage pump 15 in this embodiment is provided with a UV disinfector 19 at its outlet. The UV disinfector 19 can sterilize the clean water discharged from the drainage pump 15, thereby further improving the water quality.

Embodiment 11

On the basis of the above embodiment, the contact oxidation tank 12 in this embodiment is connected to a fan 21. With the fan 21, the contact oxidation tank 12 can be supplied with fresh air, to supplement the oxygen required by the contact oxidation tank 12, while providing a certain cooling effect.

Embodiment 12

On the basis of the above embodiment, the drainage pump 15 in this embodiment is connected to a backwash pipeline

16. The drainage pump 15 pumps water into the system via the backwash pipeline 16, which can further clean the drainage pump 15 and pipelines in communication with it, so as to prevent structures including drainage pump 15 and the pipelines in communication with it from being blocked due to long-term use.

The other steps in the present embodiment are identical to those in the above-mentioned embodiments and will not be repeated herein.

The above-mentioned embodiments are only preferred embodiments of the present invention and are not restricted thereto in any way. Any simple modification and equivalent alterations made to these embodiments based on the technical essence of the present invention fall within the protection scope of the present disclosure.

The invention claimed is:

1. A wetland system for treating domestic wastewater and rainwater, comprising a wetland structure and a wastewater treatment device,
   wherein the wetland structure comprises a plurality of planting areas, each planting area is surrounded by hoardings and comprises a plurality of planting frames arranged in the hoardings, each planting frame comprises a growing substrate provided therein and wetland plants growing in the growing substrate,
   the wastewater treatment device comprises a bar screen, a regulating tank, a hydrolysis acidification tank, a contact oxidation tank, an MBR membrane tank, and a clean water tank that are in communication with each other in sequence along a direction of waterflow and arranged underground, the bar screen is provided with a plurality of bars therein, a lift pump is disposed between and connected to the regulating tank and the hydrolysis acidification tank, a drainage pump is disposed between and connected to the MBR membrane tank and the clean water tank, each planting area is connected to the bar screen, and the clean water tank is connected to the planting area, and
   each planting frame has first two opposite sides and second two opposite sides connected to form an enclosure, each of the first two opposite sides is provided with a protrusion, each of the second two opposite sides is provided with a groove, and every two adjacent planting frames are integrated with each other through matching of a corresponding protrusion and a corresponding groove, and the hoardings are provided with grooves fitted with adjacent planting frames via the corresponding protrusions.

2. The wetland system for treating domestic wastewater and rainwater according to claim 1, wherein the planting area is polygonal with a 90° corner thereof.

3. The wetland system for treating domestic wastewater and rainwater according to claim 1, wherein each planting frame is made of a water permeable material.

4. The wetland system for treating domestic wastewater and rainwater according to claim 1, wherein two adjacent planting areas are in communication with each other via pipelines, and the hoardings are made of a water impermeable material.

5. The wetland system for treating domestic wastewater and rainwater according to claim 1, wherein the MBR membrane tank and the hydrolysis acidification tank are connected by a reflux pipeline.

6. The wetland system for treating domestic wastewater and rainwater according to claim 1, wherein the MBR membrane tank is connected to a sludge thickener, and a sludge pump is disposed between and connected to the MBR membrane tank and the sludge thickener.

7. The wetland system for treating domestic wastewater and rainwater according to claim 1, wherein the MBR membrane tank is connected to a dosing device.

8. The wetland system for treating domestic wastewater and rainwater according to claim 1, wherein a UV disinfector is arranged at an outlet of a disinfection tank, a fan is connected to the contact oxidation tank, and a backwash pipeline is connected to the drainage pump.

* * * * *